April 19, 1932. W. G. WILSON 1,854,358
ADJUSTMENT FOR BRAKE AND CLUTCH MECHANISM
Filed Dec. 11, 1928
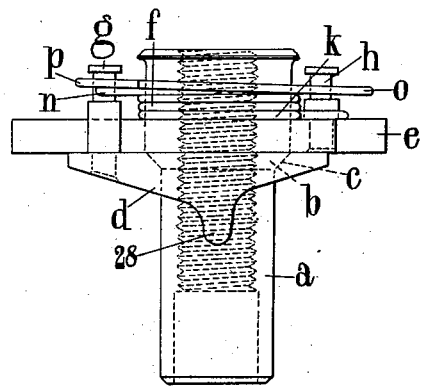
Fig.1.
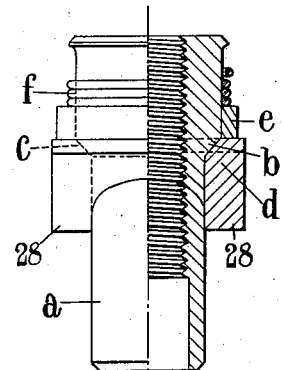
Fig.2.
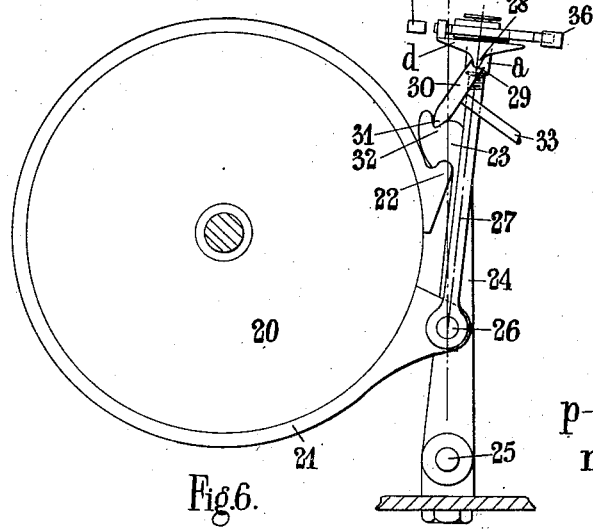
Fig.6.
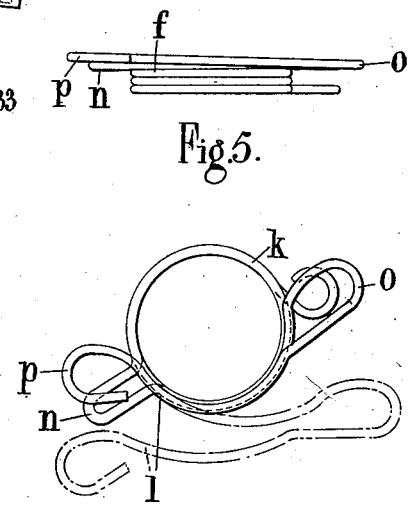
Fig.5.
Fig.4.
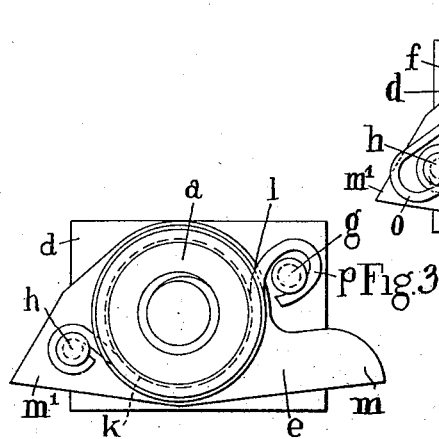
Fig.3. Fig.3.ᵃ
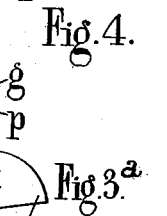
W. G. Wilson
INVENTOR
By Marks & Clerk
ATTYS Patented Apr. 19, 1932

1,854,358

UNITED STATES PATENT OFFICE

WALTER GORDON WILSON, OF WESTMINSTER, ENGLAND

ADJUSTMENT FOR BRAKE AND CLUTCH MECHANISM

Application filed December 11, 1928, Serial No. 325,215, and in Great Britain January 9, 1928.

This invention relates to the adjustment of brake and clutch mechanism, for the purpose of "taking up" any slack that may occur due to wear, stretching or other reason. The invention is applicable amongst other purposes to compensating for the wear of brake mechanism, or for the wear on reaction bands as used for example on epicyclic gearing.

More particularly the invention relates to brake adjusting mechanism in which the flexible brake band was designed to be applied by means of toggle-acting mechanism, and for the purpose of taking up slack, the free end of the brake band terminated in a screwed bolt, upon which a nut was screwed. As wear developed the nut was adapted to receive minute screwing-up adjustments which were effected automatically whenever the brake applying movement became abnormal in extent. Such adjusting mechanism involved the use of a one-way ball clutch which was under spring influence, and the device was so arranged that the one-way clutch was operated during the brake actuation stroke and the take-up was effected on the off-stroke.

The object of the present invention is to simplify such a form of take-up mechanism whereby the spring that is used is adapted to function both as a one-way clutch and as a lock to prevent any turning of the nut due to vibration.

Reference will now be made to the accompanying drawings, in which:

Figure 1 is a side elevation of the improved locking device,

Figure 2 is an end elevation with one half in section,

Figure 3 is a plan view of the device showing a simple form of spring,

Figure 3a is a similar view showing a modified form of the spring,

Figure 4 is a plan view of the modified locking spring detached, and

Figure 5 is a side view of the modified detached spring, and

Figure 6 is a side elevation of a toggle-actuated braking mechanism, to which the invention is applied.

The form of brake mechanism to which the invention is applied by way of example will first be described by reference to Figure 6.

The rotating member 20, the speed of which is to be checked is encircled by a band brake 21, one free end of which is hooked at 22 to engage with the similarly hooked end 23 of a link 24 anchored at 25 to a fixed part. The other free end of the brake band 21 is pivoted at 26 to the lower end of a toggle rod 27 whose upper end is screw threaded to engage a nut $a$ which is shown detached in Figures 1 and 2. Such nut has a conical shoulder $b$ to engage a similar seating $c$ formed in a toggle collar $d$ which is formed on each side with a knife edge 28 adapted to engage in a socket 29 on one end of a toggle lever 30, the other end of which has a knife edge 31 mounted in a socket 32 formed on the end 23 of the link 24. The toggle lever 30 carries an actuating handle 33, and when such handle is raised to apply the brake, the centre axis of the toggle rod 27 is swung through an arc indicated at 34 whereby the toggle lever passes over or up to a dead centre so that a powerful toggle action is exerted to apply the brake. This movement is accompanied by the toggle collar $d$ and the parts hereafter described which it carries, the whole having a movement between two fixed stops 35 and 36 for a purpose hereinafter described.

According to the present invention the nut $a$ seated in the collar $d$ is at its upper part surrounded by a ring or actuating member $e$, and above this the completely cylindrical nut $a$ is surrounded or embraced by the multiple convolutions of a helical spring generally denoted by $f$, one free end of which is anchored at $g$ to the toggle collar $d$, the other end being anchored at $h$ to the actuating member $e$. The helical spring preferably has about five convolutions around the nut, of which the lower three are drawn sufficiently tight so that they have a working fit, and the other or upper two coils are substantially loose.

In order to impart to the nut a tendency for it to be screwed on to its bolt (it being shown for example, with a right hand thread) the terminal end of the relatively tightly fitting convolutions is tangentially led at $h$ to its anchorage point $h$, so as to constitute as it were a stiff anchorage, but the terminal ends of the relatively loose convolutions follow a curved line as at $l$ to its anchorage point to form as it were loose anchorage.

In Figure 4 such line $l$ is shown in full lines in its final position and also in dotted lines before being finally secured in position. Thus supposing the nut is turned, then in one direction it will have a tendency to wind up the spring upon itself, and to unwind the spring when turned in the other direction.

By means of such a spring it is to be understood that as wear develops, the increase in the stroke of the brake mechanism as it is applied will bring the extremity $m'$ of the actuating member $e$ into contact with the stop 35, Figure 6, which will give the actuating member $e$ a minute anticlockwise idle movement having no effect on the nut. When the brake is next relaxed the opposite extremity $m$ will come into contact with the stop 36 which positively imparts to the nut a minute clockwise adjustment to take up the wear; at the same time when the brake is "off" the initial set of the helical spring will prevent the nut working back due to the vibration of the engine.

It is to be observed, with the above described form of spring that when the brake is "off", the vibration of the mechanism might have a tendency to screw the nut "on" as the parts are not under tension. To prevent any such tendency, the spring may be modified as follows:

The same arrangement of tight and loose convolutions of the spring is used, but one of the loose coils is made with a projecting radial loop $n$, after which the coil is looped as at $o$ around the stud $h$ which forms the stiff anchorage on the collar $e$, is then doubled back upon itself half round the nut (see dotted lines Figure 4) and finally hooked or anchored as at $p$ upon a stud $g$ provided on the toggle collar $d$. The two studs may be arranged upon the opposite ends of a diametrical line passing through the axis of the nut, or the two studs brought close together, so as to impart more stress to the doubled back part of the spring. For example, the stud $h$ may be brought round to a position defined by the dotted circle $x$. The projecting radial loop $n$ of the spring is designed to lie yieldingly in contact with the stud $g$ on the actuating member $d$ and by so doing to apply to the spring a "bias" tending to screw the nut "off" whereas by looping the coil around the stiff anchorage stud $h$, and thereafter hooking it upon the stud $g$ on the toggle collar the terminal part of the coil receives a "bias" to screw the nut "on" to its bolt.

Thus neutralizing forces are set up on the nut so that it will be prevented from moving either way, but should it, in an extreme case, do so, then the projecting radial loop by contacting with the stud provided, will altogether prevent the nut from screwing itself "on", whilst any rotation of the nut in the opposite direction need not matter as the "take up" movement of the device will very soon correct it.

Under normal conditions, however, the device is a self-contained locking member that presents no loose parts to rattle and shake.

Having now described my invention, what I claim as new and desire to secure by Letters Patent is:—

1. A slack take-up device of the character described comprising a control rod, a toggle lever mechanism actuated by said rod, a brake rod, a nut screwed on the end of said brake rod, a toggle collar surrounding said nut and forming a seating therefor and engaging with the toggle lever mechanism, a further actuating member surrounding said nut, a helical spring encircling the nut with a number of convolutions some of which fit the nut tightly whilst the others have a relatively loose fit, the tight fitting coils ending in a stiff anchorage mounted upon the actuating member, while the loose coils have a slack anchorage on the toggle collar, and two fixed stops on either side of and entirely separate from said actuating member.

2. A device as claimed in claim 1, in which one end of the helical spring after passing round the anchorage on the actuating member is formed with a radial loop adapted to act as a stop by coming into contact with the anchorage on the toggle collar, after which the said spring is doubled back upon itself and finally hooked around the anchorage of the said toggle collar.

In testimony whereof I have signed my name to this specification.

WALTER GORDON WILSON.